US010592917B2

United States Patent
Kim et al.

(10) Patent No.: US 10,592,917 B2
(45) Date of Patent: Mar. 17, 2020

(54) METHOD AND SYSTEMS FOR DETERMINING PROGRAMMATICALLY EXPECTED PERFORMANCES

(71) Applicants:Eric Kim, Irvine, CA (US); Karen Simmons, Atlanta, GA (US); Ryan Wright, Foothill Ranch, CA (US); Sumana Ganne, Atlanta, GA (US)

(72) Inventors: Eric Kim, Irvine, CA (US); Karen Simmons, Atlanta, GA (US); Ryan Wright, Foothill Ranch, CA (US); Sumana Ganne, Atlanta, GA (US)

(73) Assignee: Cox Automotive, Inc., Atlanta, GA (US)

( * ) Notice: Subject to any disclaimer, the term of this patent is extended or adjusted under 35 U.S.C. 154(b) by 308 days.

(21) Appl. No.: 15/585,882

(22) Filed: May 3, 2017

(65) Prior Publication Data
US 2017/0323326 A1    Nov. 9, 2017

Related U.S. Application Data

(60) Provisional application No. 62/331,280, filed on May 3, 2016.

(51) Int. Cl.
*G06Q 30/00* (2012.01)
*G06Q 30/02* (2012.01)

(52) U.S. Cl.
CPC ..... *G06Q 30/0243* (2013.01); *G06Q 30/0255* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 8,355,932 | B2* | 1/2013 | Malackowski | G06Q 10/067 705/4 |
| 8,996,978 | B2* | 3/2015 | Richstein | G06F 3/0488 715/215 |
| 2003/0014336 | A1* | 1/2003 | Dao | G06Q 30/0282 705/30 |
| 2004/0103426 | A1* | 5/2004 | Ludvig | H04H 20/86 725/9 |
| 2004/0158536 | A1* | 8/2004 | Kowal | G06Q 10/02 705/400 |

(Continued)

*Primary Examiner* — Matthew T Sittner
(74) *Attorney, Agent, or Firm* — Eversheds Sutherland (US) LLP

(57) ABSTRACT

Embodiments of the present disclosure provide methods, systems, apparatuses, and computer program products for assessing a performance and/or determining a programmatically expected performance of a marketing campaign. In one embodiment a method for creating a unified data set from a plurality of data sets received from third-party service providers is disclosed. In one embodiment, a graphical user interface is used to facilitate user access to visual representation of the unified data set. In one embodiment, the unified data set may be used to train a machine learning model. In some implementations, the machine learning model may predict an expected performance for marketing campaigns. In one embodiment, the machine learning model may adjust one or more parameters of the marketing campaign in order to increase the effectiveness of the marketing campaign and the associated revenue.

23 Claims, 14 Drawing Sheets

(56) References Cited

U.S. PATENT DOCUMENTS

| | | | | |
|---|---|---|---|---|
| 2004/0215656 A1* | 10/2004 | Dill | | G06Q 30/02 |
| 2006/0004628 A1* | 1/2006 | Axe | | G06Q 30/02 |
| | | | | 705/14.46 |
| 2006/0136315 A1* | 6/2006 | Muthiki | | G06Q 30/02 |
| | | | | 705/35 |
| 2007/0213860 A1* | 9/2007 | McGushion | | G06Q 10/06 |
| | | | | 700/95 |
| 2010/0287191 A1* | 11/2010 | Price | | G06F 16/951 |
| | | | | 707/769 |
| 2011/0202402 A1* | 8/2011 | Fowler | | G06Q 30/02 |
| | | | | 705/14.25 |
| 2012/0036580 A1* | 2/2012 | Gorny | | H04L 63/1433 |
| | | | | 726/25 |
| 2012/0150626 A1* | 6/2012 | Zhang | | G06Q 30/0241 |
| | | | | 705/14.42 |
| 2013/0031499 A1* | 1/2013 | Vishnubhatta | | G06Q 10/06 |
| | | | | 715/765 |
| 2014/0052592 A1* | 2/2014 | Herndon | | G06Q 40/00 |
| | | | | 705/31 |
| 2014/0282725 A1* | 9/2014 | Brandstetter | | H04N 21/812 |
| | | | | 725/36 |
| 2014/0331159 A1* | 11/2014 | Hillary | | G06Q 10/00 |
| | | | | 715/769 |
| 2014/0358694 A1* | 12/2014 | Beckerman | | G06Q 30/0242 |
| | | | | 705/14.69 |
| 2015/0199731 A1* | 7/2015 | Jevtic | | G06Q 30/0243 |
| | | | | 705/14.73 |
| 2015/0206206 A1* | 7/2015 | Puente | | G06Q 30/0283 |
| | | | | 705/307 |
| 2015/0242906 A1* | 8/2015 | Liu | | G06Q 30/0275 |
| | | | | 705/14.71 |
| 2015/0262221 A1* | 9/2015 | Nakano | | G06Q 30/0246 |
| | | | | 705/14.45 |
| 2015/0379429 A1* | 12/2015 | Lee | | G09B 5/00 |
| | | | | 706/11 |
| 2015/0379430 A1* | 12/2015 | Dirac | | G06N 20/00 |
| | | | | 706/12 |
| 2016/0021202 A1* | 1/2016 | Peterson | | H04L 67/22 |
| | | | | 709/204 |
| 2016/0034968 A1* | 2/2016 | Dai | | G06F 16/9535 |
| | | | | 705/14.66 |
| 2016/0042351 A1* | 2/2016 | Syed | | G06Q 20/3221 |
| | | | | 705/39 |
| 2016/0086215 A1* | 3/2016 | Wang | | G06Q 30/0246 |
| | | | | 705/14.45 |
| 2016/0156641 A1* | 6/2016 | Kondapalli | | H04L 63/1408 |
| | | | | 726/22 |
| 2016/0188676 A1* | 6/2016 | Barker | | H04L 47/762 |
| | | | | 707/770 |
| 2016/0209818 A1* | 7/2016 | Mandle | | G05B 15/02 |
| 2016/0292722 A1* | 10/2016 | Myers | | G06F 16/9535 |
| 2017/0068964 A1* | 3/2017 | Gevka | | G06Q 30/018 |
| 2017/0091811 A1* | 3/2017 | Saxena | | G06Q 30/0247 |
| 2017/0140297 A1* | 5/2017 | Karumanchi | | G06Q 10/063 |
| 2017/0186021 A1* | 6/2017 | Lee | | G06Q 30/0201 |
| 2017/0213254 A1* | 7/2017 | Bhalgat | | G06Q 30/0275 |
| 2017/0236160 A1* | 8/2017 | Oberoi | | G06Q 30/0261 |
| | | | | 705/14.66 |
| 2017/0323326 A1* | 11/2017 | Kim | | G06Q 30/0243 |

* cited by examiner

METHOD AND SYSTEMS FOR DETERMINING PROGRAMMATICALLY EXPECTED PERFORMANCES

CROSS-REFERENCE TO RELATED APPLICATIONS

The disclosure claims priory to and the benefit of U.S. provisional patent application No. 62/331,280, filed May 3, 2016, which is incorporated herein by reference in its entirety.

BACKGROUND

A wide variety of service providers, such as cable providers and satellite providers, may connect user devices to one or more networks such as the Internet. A promotional and marketing service may utilize the Internet to provide consumers with available offers or advertisements related to products, services or experiences that may be of interest. Businesses often utilize services offered by third-party providers in order to provide relevant content and advertisements to consumers. A business may receive, from different third-party providers, different data sets that may variously include aggregated or non-aggregated performance data, analytics data, historical data, marketing campaign data, and/or the like.

Applicant has identified a number of deficiencies and problems associated with assessing the performance of a marketing campaign and/or predicting the performance of a marketing campaign based on such data sets. Through applied effort, ingenuity, and innovation, many of these identified problems have been solved by developing solutions that are included in embodiments of the present disclosure, many examples of which are described in detail herein.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION OF VARIOUS EMBODIMENTS

Figure 1:
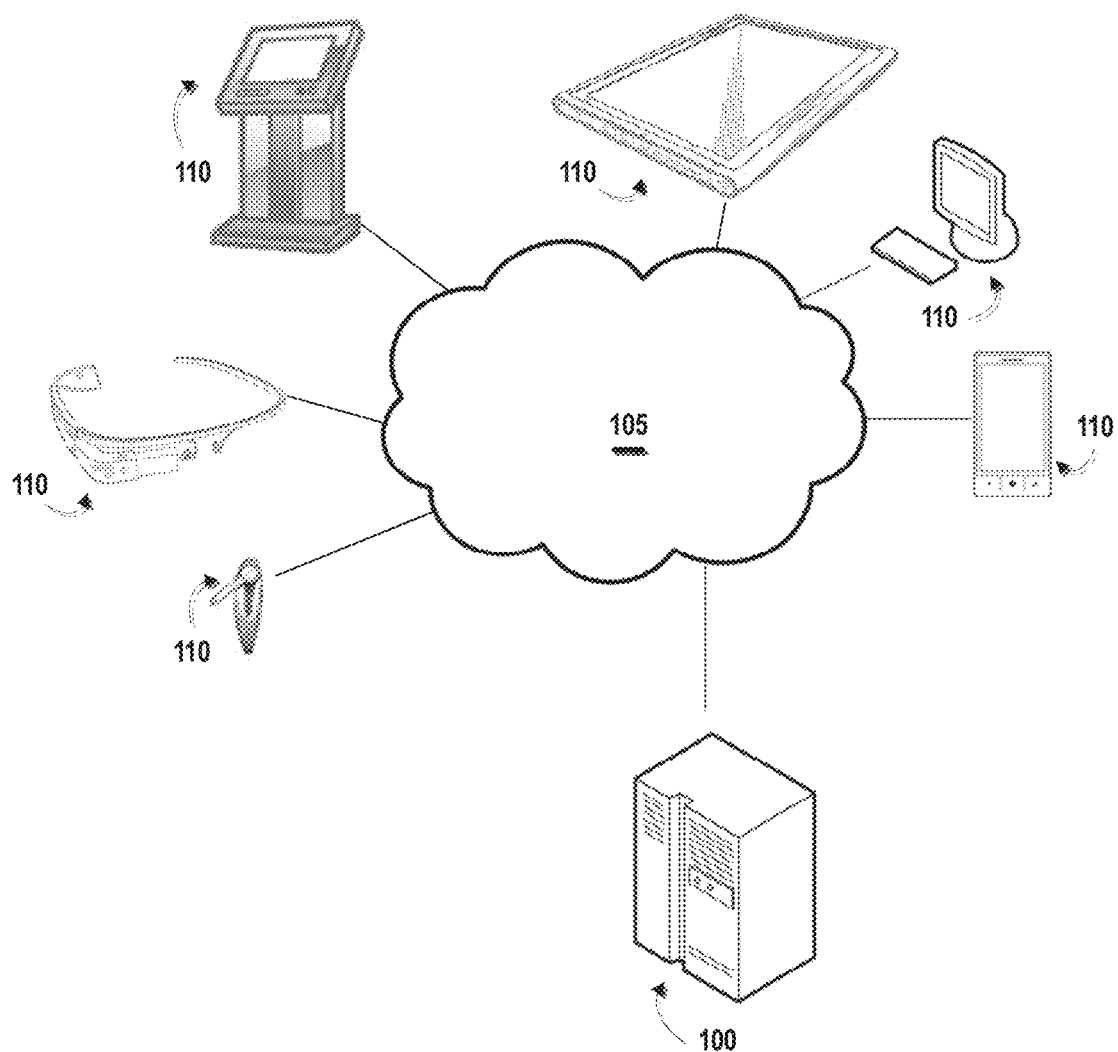
FIG. 1 is an overview of a system that can be used to practice embodiments of the present disclosure.

This specification relates to systems and methods for assessing the performance and/or determining a programmatically expected performance of a marketing campaign, an advertisement, a website, and/or the like.

Particular embodiments of the subject matter described herein can be implemented so as to realize one or more of the following advantages.

One advantage is to provide accurate and efficient methods and systems for predicting performances of marketing campaigns and behaviors of consumers during a pre-specified period. In turn, the predictions may be used to enhance, optimize, and adjust marketing and advertising efforts. Another advantage is to reduce the cost associated with marketing and advertising efforts that are unlikely to result in purchases and, in turn, increase the overall revenue. Another advantage is to reduce the required processing power for servers. Similarly, reduction of the required processing power increases the overall revenue. Particular embodiments of the subject matter allow for optimizing website and/or webpage layouts such that consumers' satisfaction is increased, and providing consumers with promotions at webpages that are likely to result in a maximized number of conversions and purchases. Also, additional traffic and additional sales may be generated through the websites and in turn increase revenue.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities.

I. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, a flexible disk, hard disk, solid-state storage (SSS) (e.g., a solid state drive (SSD)), a solid state card (SSC), a solid state module (SSM), an enterprise flash drive, magnetic tape, or any other non-transitory magnetic medium, and/or the like. A non-volatile computer-readable storage medium may also include a punch card, paper tape, an optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMCs), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE SYSTEM ARCHITECTURE

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Example Management Computing Entity

Figure 2:
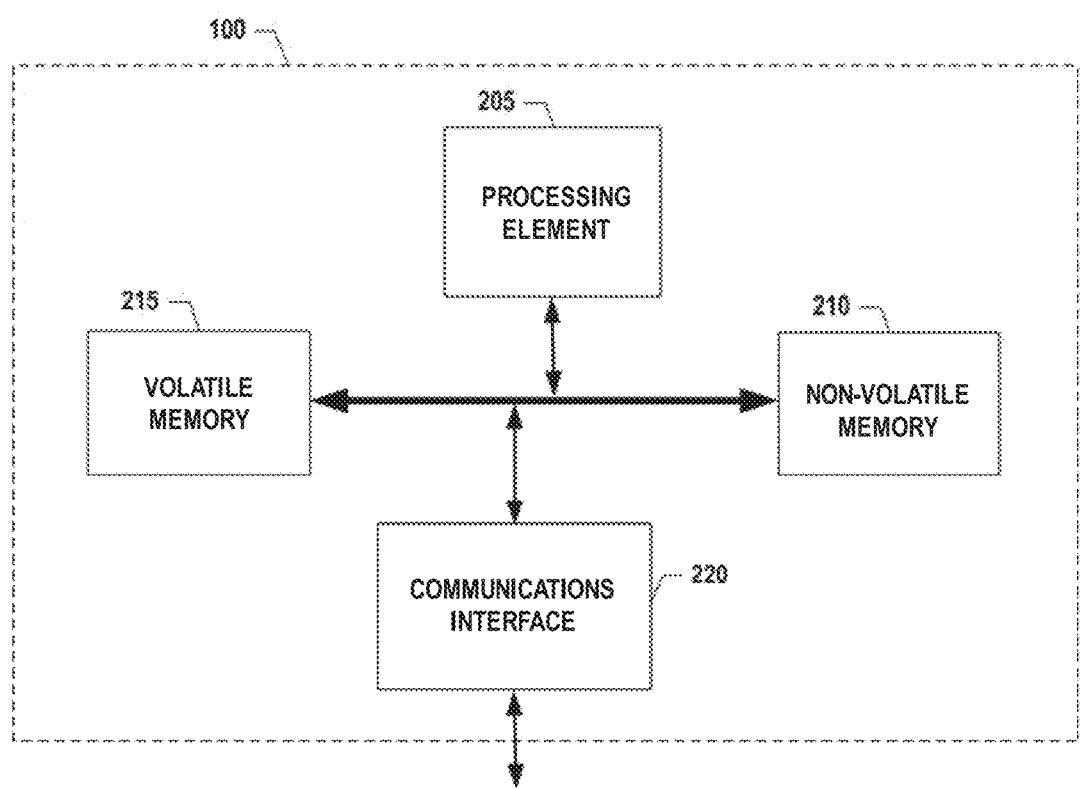
FIG. 2 is an example schematic diagram of a management computing entity according to one embodiment of the present disclosure.

FIG. 2 provides a schematic of a management computing entity 100 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory 210 including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry, and/or similar terms used herein interchangeably). In one embodiment, the volatile storage or memory may also include one or more volatile storage or memory 215 including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and the operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity 100 components may be located remotely from other management computing entity 100 components, such as in a distributed system. Furthermore, one or more of the components may be combined and additional components performing the functions described herein may be included in the management computing entity 100. Thus, the management computing entity 100 can be adapted to accommodate a variety of needs and circumstances. As will be recognized, these architectures and descriptions are provided for example purposes only and are not limited to the various embodiments.

2. Example User Device

Figure 3:
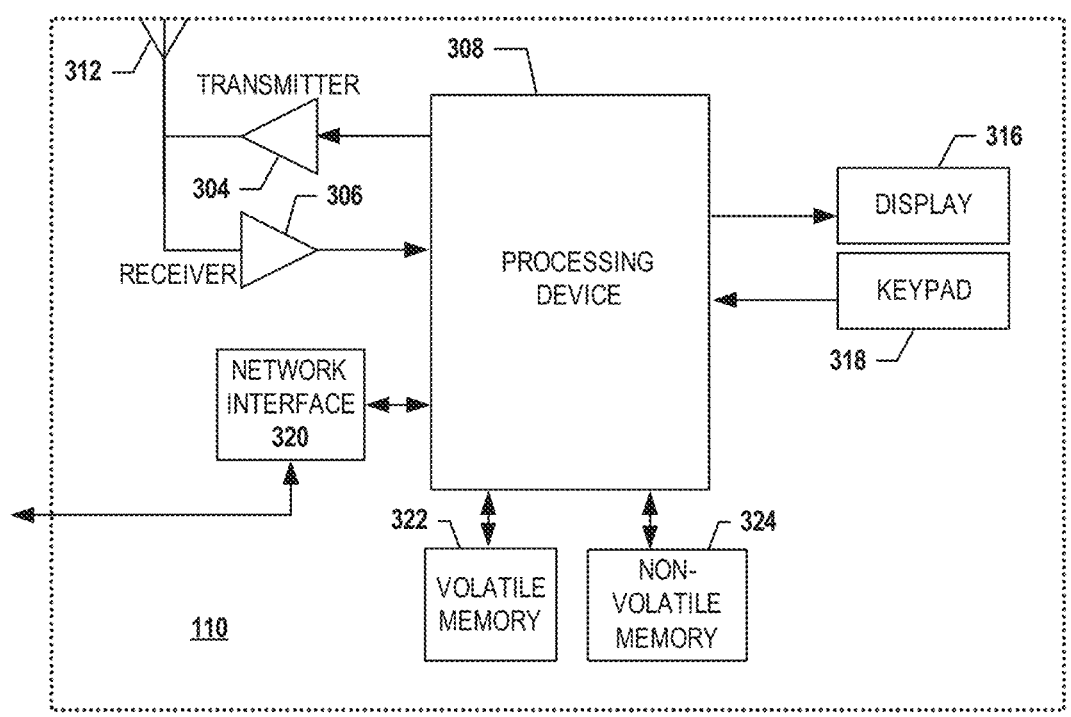
FIG. 3 is an example schematic diagram of a user device according to one embodiment of the present disclosure.

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (e.g., a radio), a receiver 306 (e.g., a radio), and a processing device 308 (e.g., CPLDs, microprocessors, multi-core processors, coprocessing entities, ASIPs, microcontrollers, and/or controllers) that provides signals to and receives signals from the transmitter 304 and the receiver 306, respectively.

The signals provided to and received from the transmitter 304 and the receiver 306, respectively, may include signaling information in accordance with the air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (e.g., including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing device 308) and/or a user input interface (coupled to a processing device 308). For example, the user interface may be a user application, a browser, a user interface, and/or similar words used herein interchangeably executing on and/or accessible via the user device 110 to interact with and/or cause the display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause the display of) the conventional numeric (0-9) and related keys (#, *), and other keys used for operating the user device 110 and may include a full set of alphabetic keys or a set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionalities that are the same or similar to those of the management computing entity 100, as described in greater detail above. As will be recognized, these architectures and descriptions are provided for example purposes only and are not limited to the various embodiments.

III. EXAMPLE SYSTEM OPERATION

Figure 4:
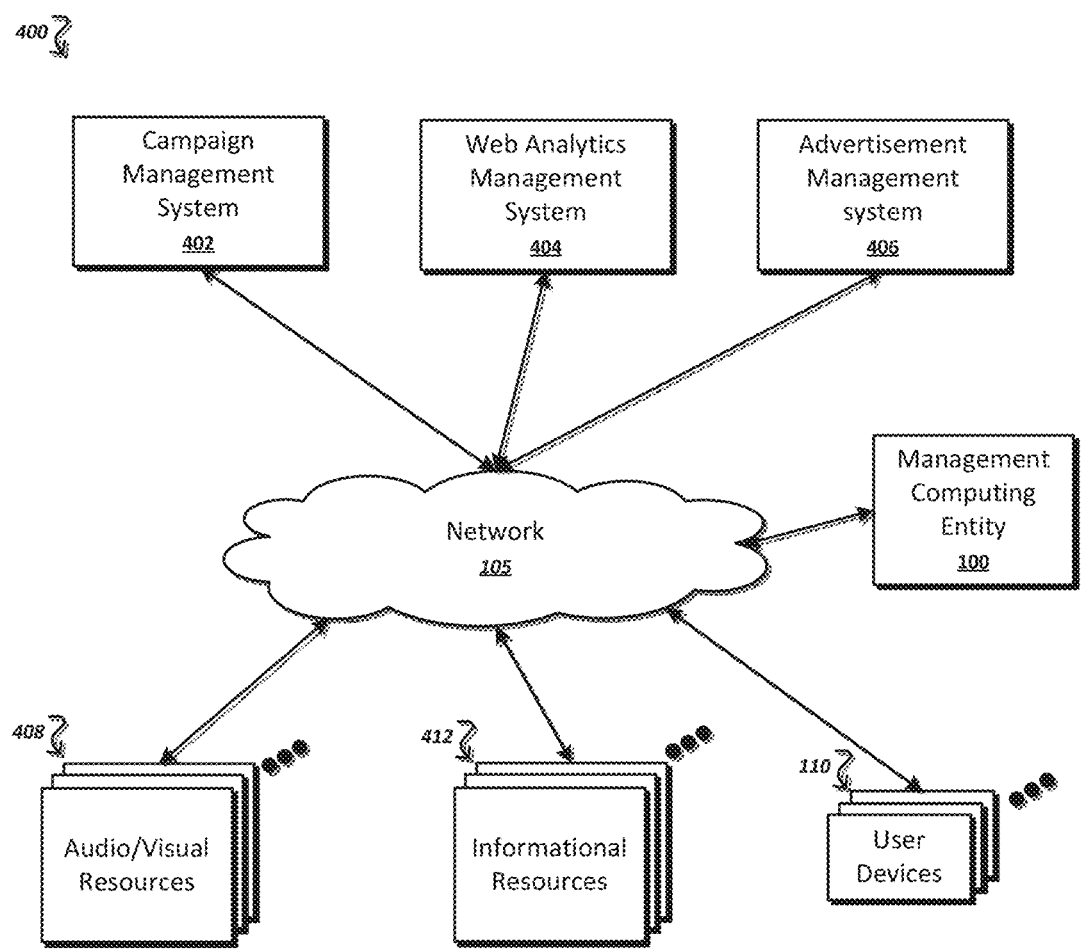
FIG. 4 illustrates an example data flow according to various embodiments of the disclosure.

FIG. 4 depicts an environment 400 at which at which one or more devices operate in accordance with embodiments of the invention. Management computing entity 100 and user devices 110 may be connected to network 105 (e.g., internet). User devices 110 may be in communication with management computing entity 100 and/or other user devices 110 via network 105. Management computing entity 100 and user devices 110 may access a variety of informational resources 412 and/or audio/visual resources via network 105 (e.g., internet). In some implementations, informational resources 412 may be webpages. In some implementations, audio/visual resources may be audio and/or video content (audiovisual content hereafter).

In some implementations, the management computing entity 100 may be in communication with a campaign management system 402 via the network 105. In one example, the campaign management system 402 may be a third-party system for advertisement campaign management. In some implementations, the management computing entity 100 and/or the user device 110 may provide advertisement campaign data to the campaign management system 402. In one example, the advertisement campaign data may include keywords and advertisement pairs. The keyword and advertisement pairs may specify that a particular advertisement from an advertisement keyword pair is to be served to users based on user input that includes a particular keyword from the pair. For example, in response to determining that a user initiated a search for audio/visual resources 408 or informational resources 412 by providing a search term that includes the particular keyword, the particular advertisement may be provided to the user. In some implementations, the management computing entity 100 may provide a request for performance data to the campaign management system 402. In some implementations, the campaign management system 402 may provide marketing campaign data or data associated with a respective marketing campaign. For example, the campaign management system 402 may provide data associating particular marketing campaigns with particular keywords.

In some implementations, the management computing entity 100 may be in communication with a web analytics management system 404 via the network 105. In one example, the web analytics management system 404 may be a third-party system for monitoring and analyzing user behavior data. For example, the consumer behavior data may be data associated with historical information of a particular user or website visitor. The historical data may specify one or more web browsing habits of a respective user, identify one or more items that the user is currently shopping for and/or the like. In some implementations, the management computing entity 100 may provide a request for user behavior data to the web analytics management system 404. In some implementations, the web analytics management system 404 may provide user behavior data or data associated with a respective user or users' visits to a particular website. In some implementations, the user behavior data may include historical data associated with users or users' visits to the particular website. For example, the campaign management system 402 may provide historical data associated with particular user visits to a promotional or service website.

In some implementations, the management computing entity 100 may be in communication with an advertisement management system 406 via the network 105. In one example, the advertisement management system 406 may be a third-party system for advertisement campaign management.

In some implementations, the management computing entity 100 may provide a request for performance data to the advertisement management system 406. In some implementations, the advertisement management system 406 may provide advertisement performance data associated with particular advertisements. For example, the advertisement management system 406 may provide data indicative of the number of times a particular advertisement was presented to users. The advertisement management system 406 may also provide data indicative of conversions or the number of users that, for example, made a purchase after viewing the particular advertisement. Further, the advertisement management system 406 may provide data indicative of the revenue associated with a particular advertisement.

In some examples, advertisements may be audio/visual resources 408 and/or informational resources 412. In some implementations, advertisements may be presented with or within audio/visual resources 408 and/or informational resources 412.

Figure 5:
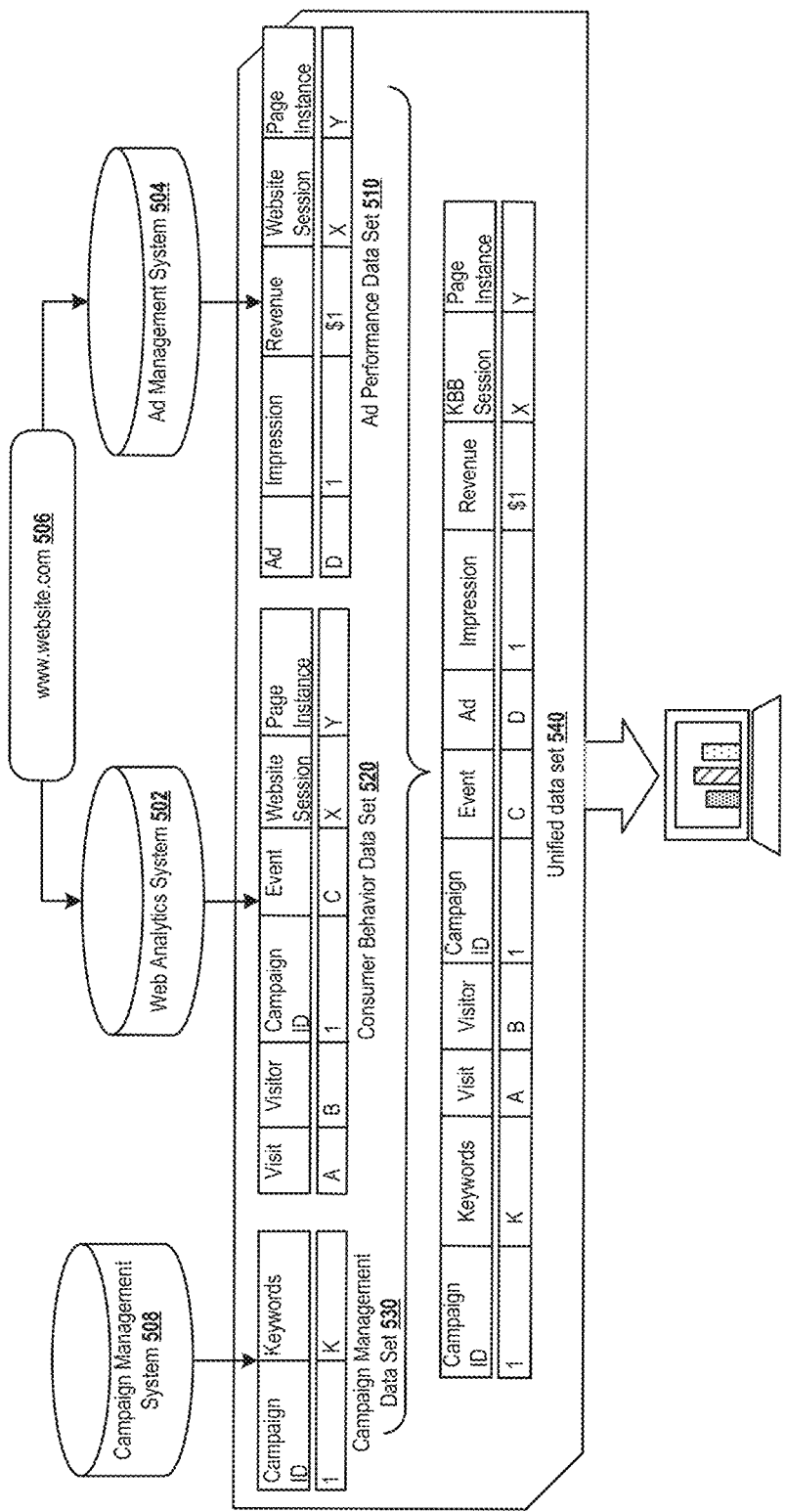
FIG. 5 illustrates an example data flow according to various embodiments of the disclosure.

FIG. 5 illustrates an example data flow according to various embodiments of the disclosure. A website 506 (e.g., www.website.com) may be a website for providing promotional content, services, advertisements, and selling of goods. In one implementation the website 506 may be a website that allows a plurality of sellers to sell items to a plurality of users. In some implementations, the items are automotive items or vehicles. In some implementations, a fee is paid by the seller and/or the buyer every time a transaction is completed using the website. Various different types of data may be used to optimize the website. In some implementations, such data is obtained or determined by a plurality of third-party service providers.

A web analytics system 502 may be a third-party system responsible for tracking user browsing behavior during, at least, visits to the website 506. The data received from different service providers may be in different formats and may include different information having different levels of granularity. The web analytics system 502 may provide a consumer behavior data set 520 to the management computing entity 100. Although a single row is shown with reference to the consumer behavior data set 520, similar rows may be included in the data set. In one implementation, each row or entry of the consumer behavior data set 520 may include a page instance identifier that identifies a particular realization of a webpage associated with a particular visit and/or visitor. In one implementation, a website session identifier may identify a particular session where the website is visited that is associated with a particular visit and/or visitor. In some implementations, the consumer behavior data set 520 may include a visit identifier that is associated with each different visit. Similarly, the consumer behavior data set 520 may include a visitor identifier that is associated with each different visitor. In some implementations, the consumer behavior data set 520 may include event data that identifies one or more user interactions with the website. In one example, the event data may identify an event that caused a user device 110 of a particular user to be redirected to the website. In one implementation, the consumer behavior data set 520 may include a campaign identifier associated with a campaign that caused the user device 110 of the particular user to be redirected to the website 506. In one implementation, the campaign identifier may generally identify a marketing campaign that a particular visitor, visit, and/or the like are associated with.

An ad management system 504 may be a third-party system responsible for managing, tracking, and monitoring the performance of advertisements associated with the website 506. The ad management system 504 may provide an ad performance data set 510 to the management computing entity 100. Although a single row is shown with reference to the ad performance data set 510, similar rows may be included in the data set. In one implementation, each row or entry of the ad performance data set 510 may include a page instance identifier that identifies a particular realization of a webpage associated with a particular advertisement and/or an advertisement impression. In one implementation, a website session identifier may identify a particular session where a particular advertisement is presented. In some implementations, the ad performance data set 510 may include an advertisement identifier that identifies a particular advertisement associated with, for example, the website session identifier and/or other data within the ad performance data set 510. The ad performance data set 510 may include an impression identifier that is associated with a particular advertisement identifier. The impression identifier may identify a particular impression of an advertisement. In some implementations, revenue data may be provided within the ad performance data set 510 in association with the identifiers discussed above.

The campaign management system 508 may be a third-party system responsible for managing, tracking, and monitoring the advertisement campaigns associated with the website 506. The campaign management system 508 may provide a campaign management data set 530 to the management computing entity 100. Although a single row is shown with reference to the campaign management data set 530, similar rows may be included in the data set. In some implementations, the campaign management data set 530 may include a campaign identifier for identifying particular campaigns associated with particular targeting keywords. The campaign management data set 530 may also include one or more keywords associated with each campaign identifier. The keywords may be used to target and serve particular advertisements to the user devices 110.

The management computing entity 100 may use data sets 510, 520, and 530 to optimize various parameters associated with the website, marketing campaigns, and advertisements. However, as described above, the data received from the campaign management system 508, the web analytics system 502, and the ad management system 504 may be in different formats and may include different information having different levels of granularity, as shown in FIG. 5. Accordingly, in some implementations, the management computing entity 100 may create a unified data set 540 that may incorporate all data and associations within the data sets 510, 520, and 530. In one implementation, rows from the ad performance data set 510 and the consumer behavior data set 520 may be combined when the website session identifiers and/or the page instance identifiers match. For example, the depicted rows of the ad performance data set 510 and the consumer behavior data set 520 may be combined because the web session identifier for both rows is X, and the page instance identifier for both rows is Y. Similarly, rows from the campaign management data set 530 may be combined with rows from the consumer behavior data set 520 (or the combined rows) when the campaign identifier matches the row pairs. For example, the depicted rows of the campaign management data set 530 and the consumer behavior data set 520 may be combined because the campaign identifier for both rows is "1." Accordingly, the depicted row of the unified data set 540 is generated by combining the rows from the data sets 510, 520, and 530 as described above. The unified data set 540 includes all information and association within the other set. Therefore, more granular determinations may be made based on the unified data set 540. For example, the unified data set 540 directly associates revenue with a particular event, visitor, and visit. This information may not be easily determined from any of the data sets 510, 520, and 530. Various optimization procedures may be performed based on the unified data set 540 as described herein.

In some implementations, the unified data set 540 may be provided to the management computing entity 100 and/or one or more user devices for presentation in a graphical user interface. FIGS. 11A-11E depict an example graphical user interface for visualizing data from the unified data set 540. The graphical user interface allows the user to visualize different aspects of the data at different levels of granularity based on user interactions with a variety of interaction elements. In one implementation, users may interact with elements of the graphical user interface to filter the data from the unified data set 540 prior to visual presentation. The user may target specific portions of the data in order to gain market insights or adjust various parameters associated with the marketing campaign, advertisements, and the website 506. Similarly, the graphical user interface allows users to visualize market data, revenue, and/or the like during a specific user defined period.

Figure 6:
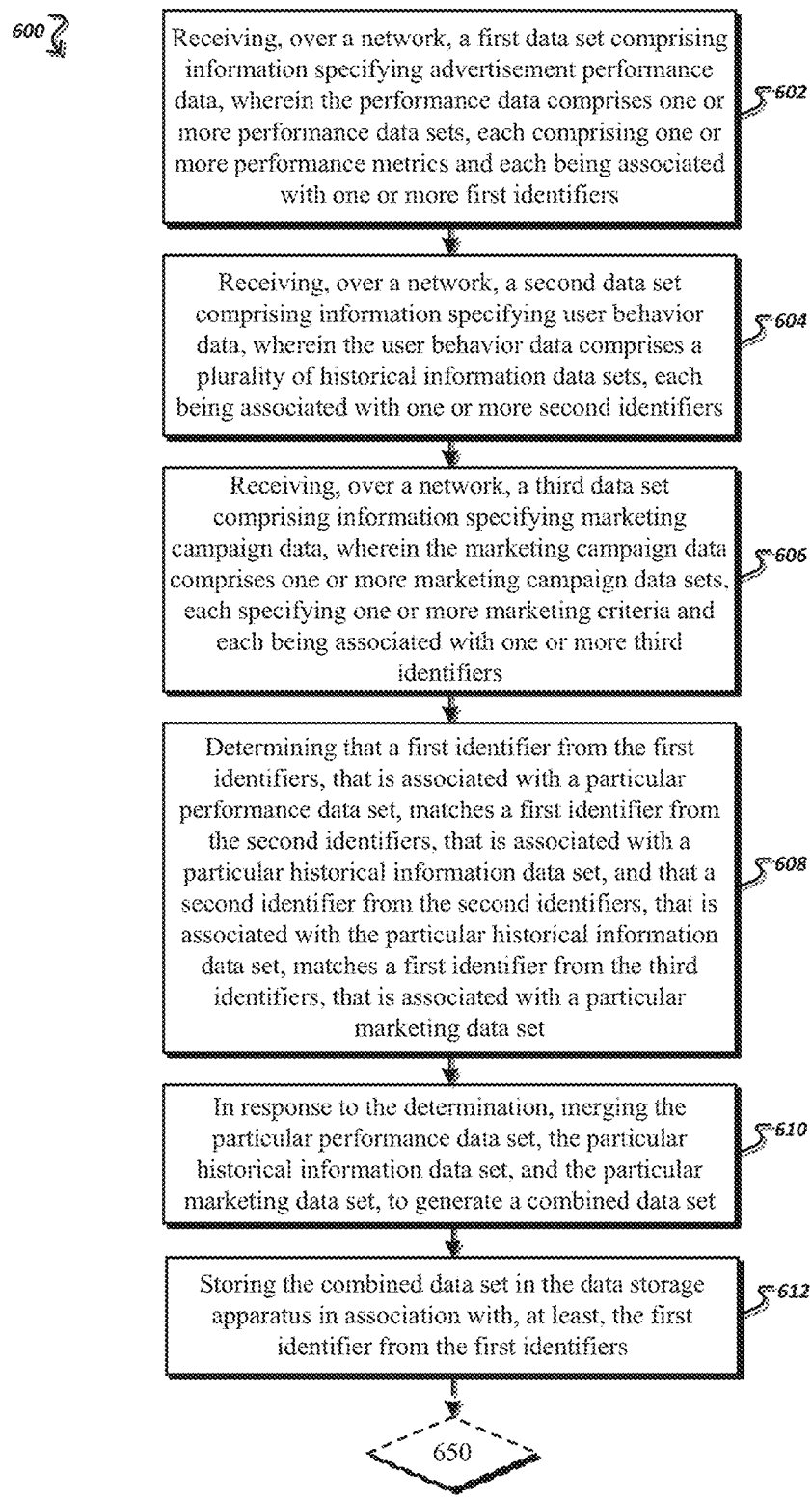
FIG. 6 is an example flowchart illustrating various procedures and operations that may be completed in accordance with various embodiments of the present disclosure.
Figure 7:
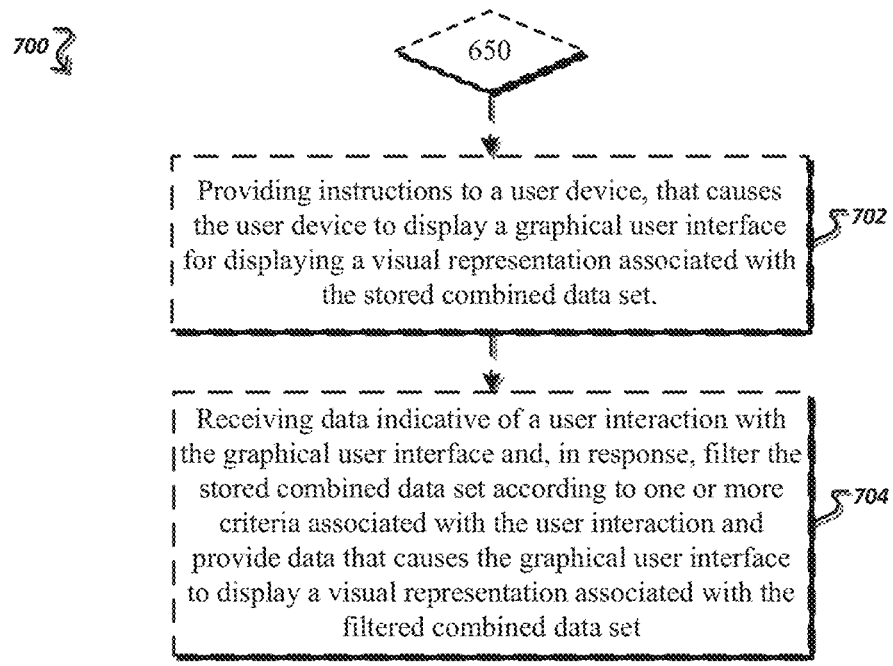
FIG. 7 is an example flowchart illustrating various procedures and operations that may be completed in accordance with various embodiments of the present disclosure.
Figure 8:
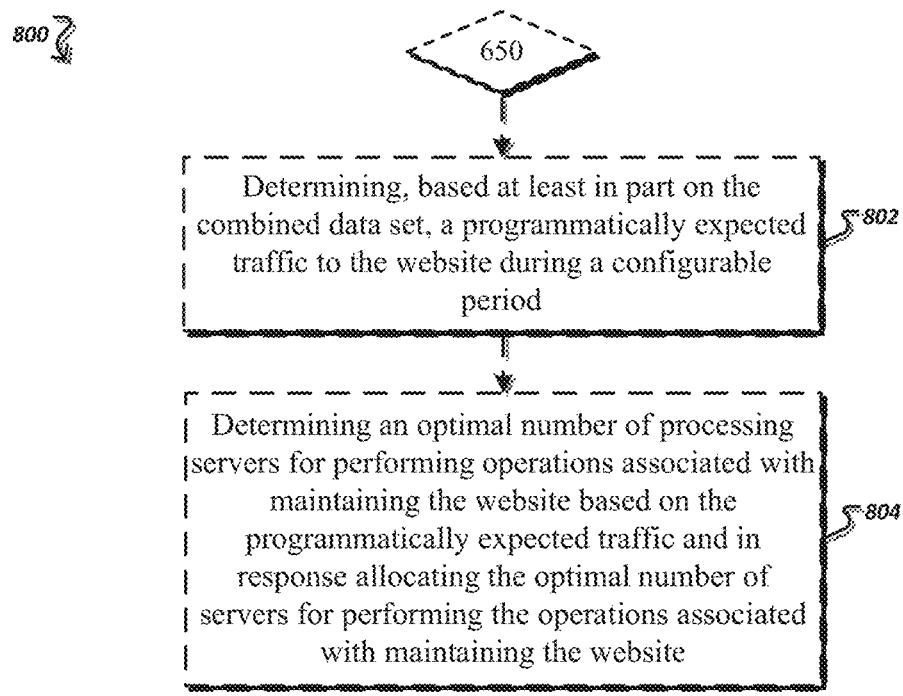
FIG. 8 is an example flowchart illustrating various procedures and operations that may be completed in accordance with various embodiments of the present disclosure.
Figure 9:
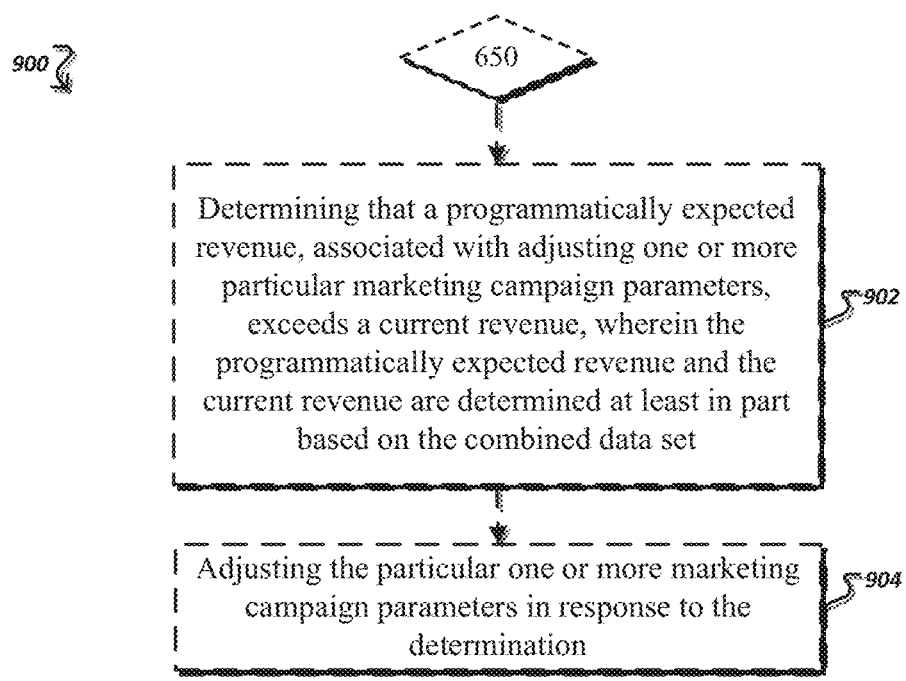
FIG. 9 is an example flowchart illustrating various procedures and operations that may be completed in accordance with various embodiments of the present disclosure.
Figure 10:
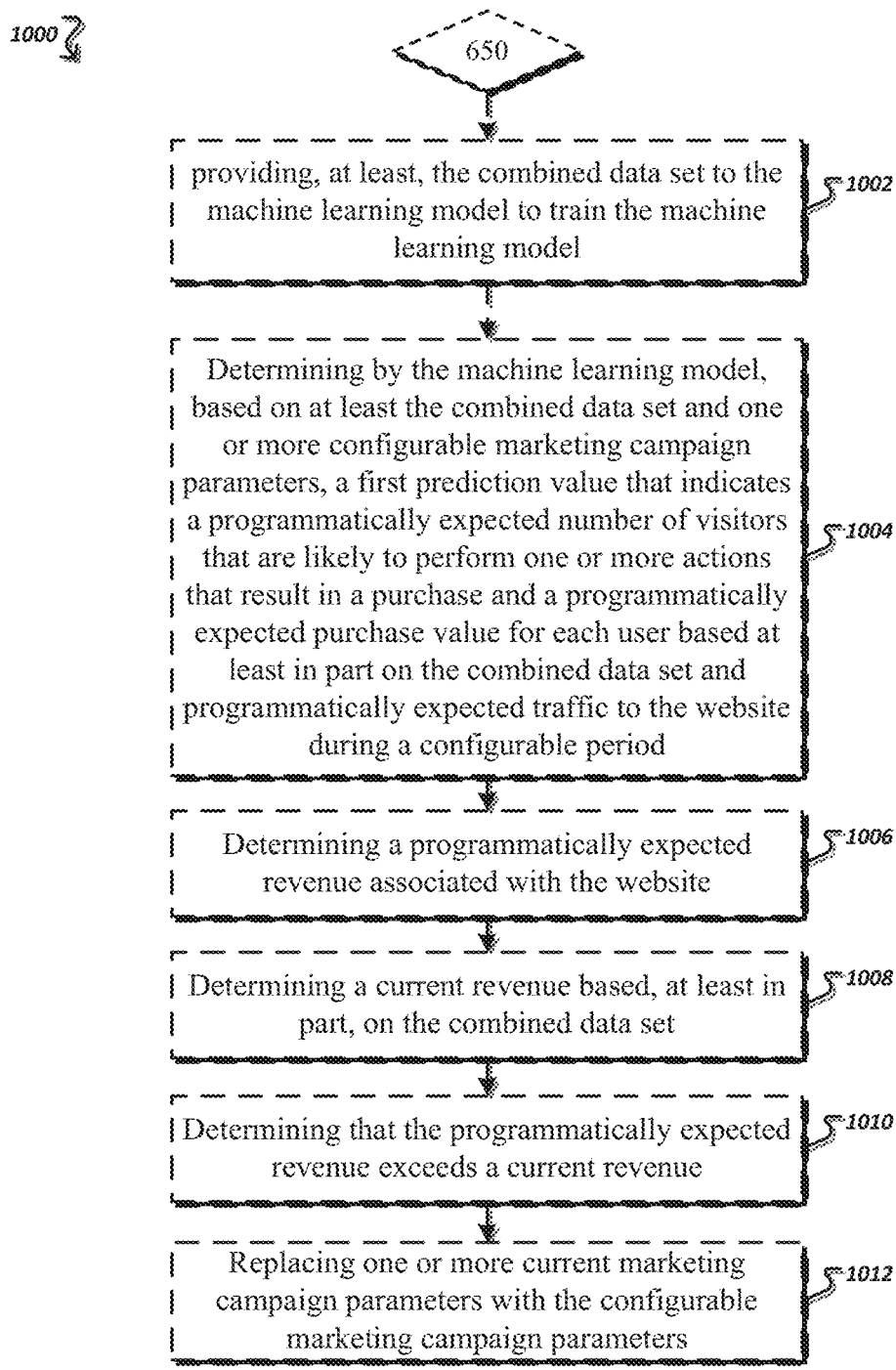
FIG. 10 is an example flowchart illustrating various procedures and operations that may be completed in accordance with various embodiments of the present disclosure.
Figure 11A:
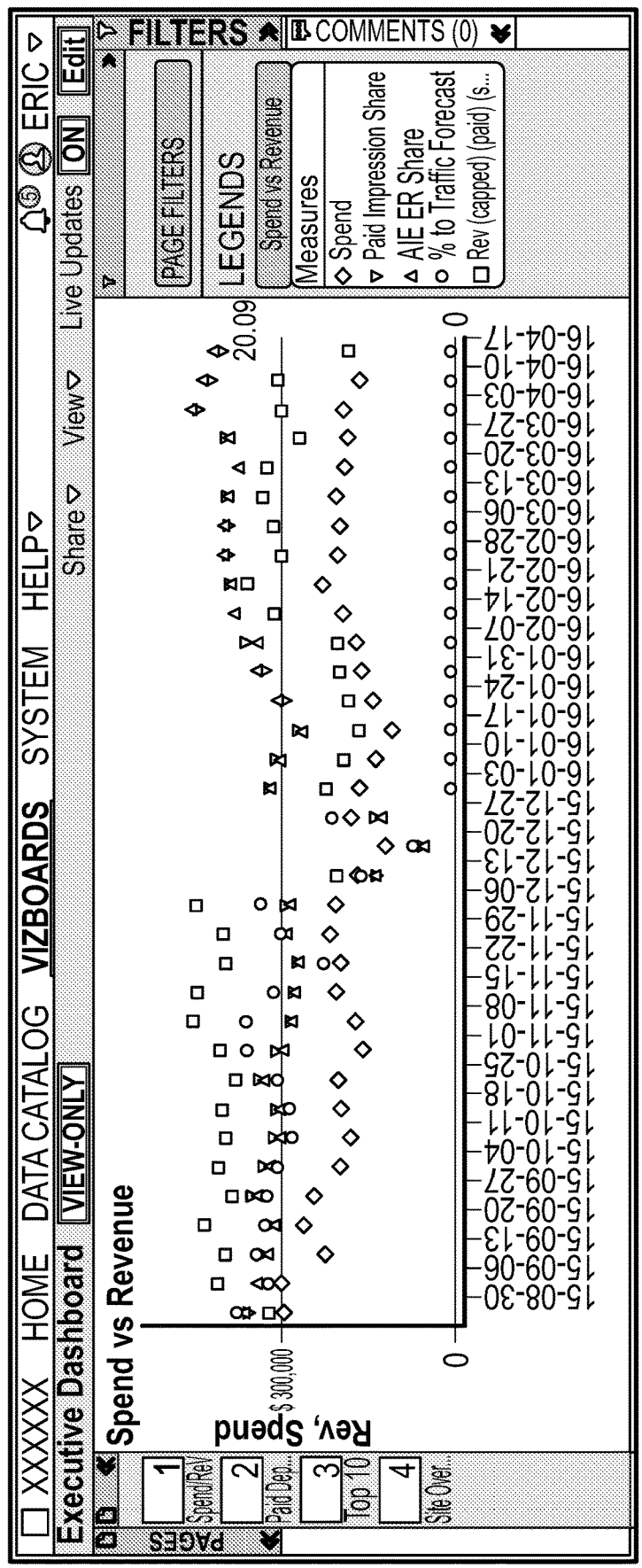
FIGS. 11A-11E illustrate various example graphical user interfaces in accordance with embodiments of the present disclosure.
Figure 11B:
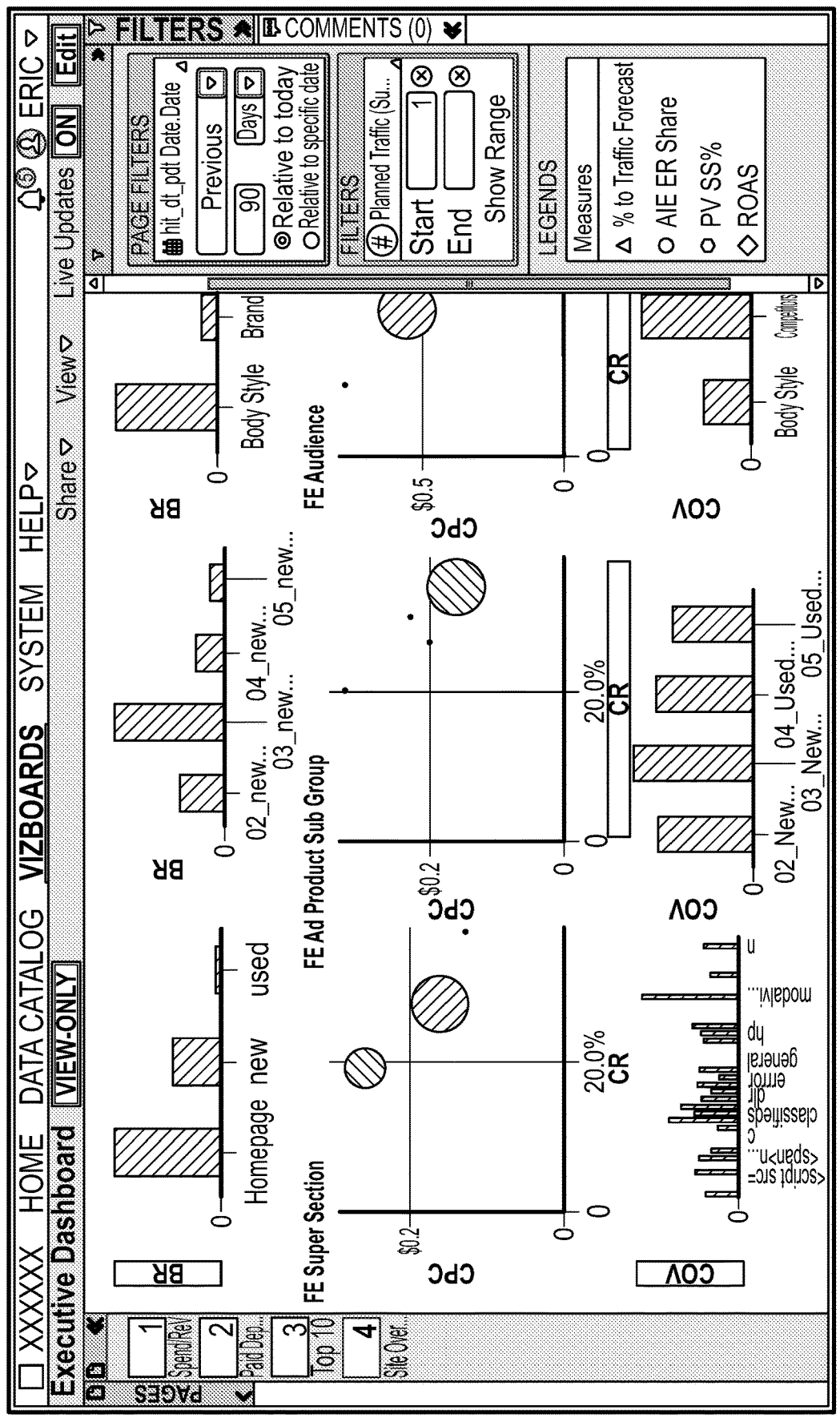
Figure 11C:
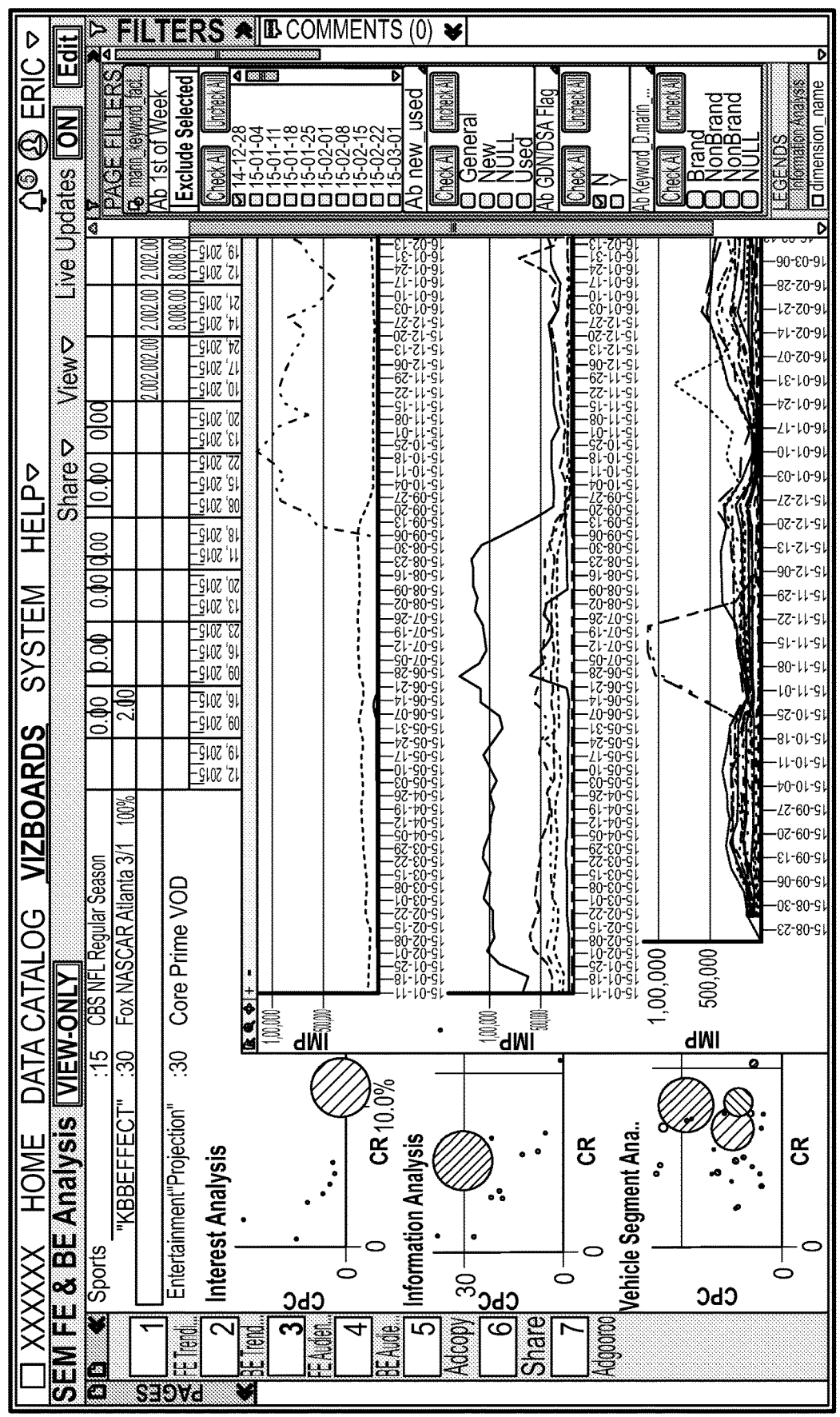
Figure 11D:
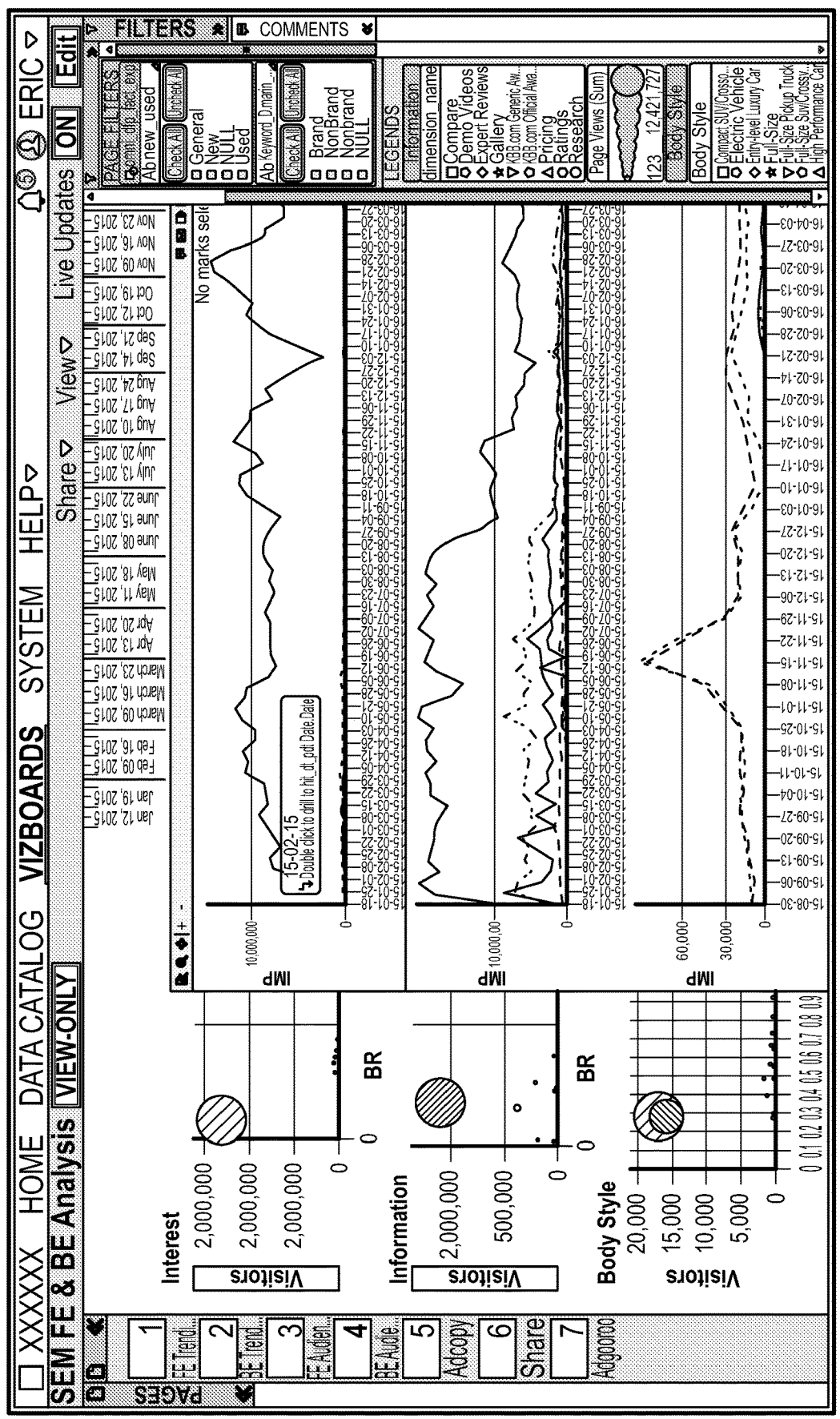
Figure 11E:
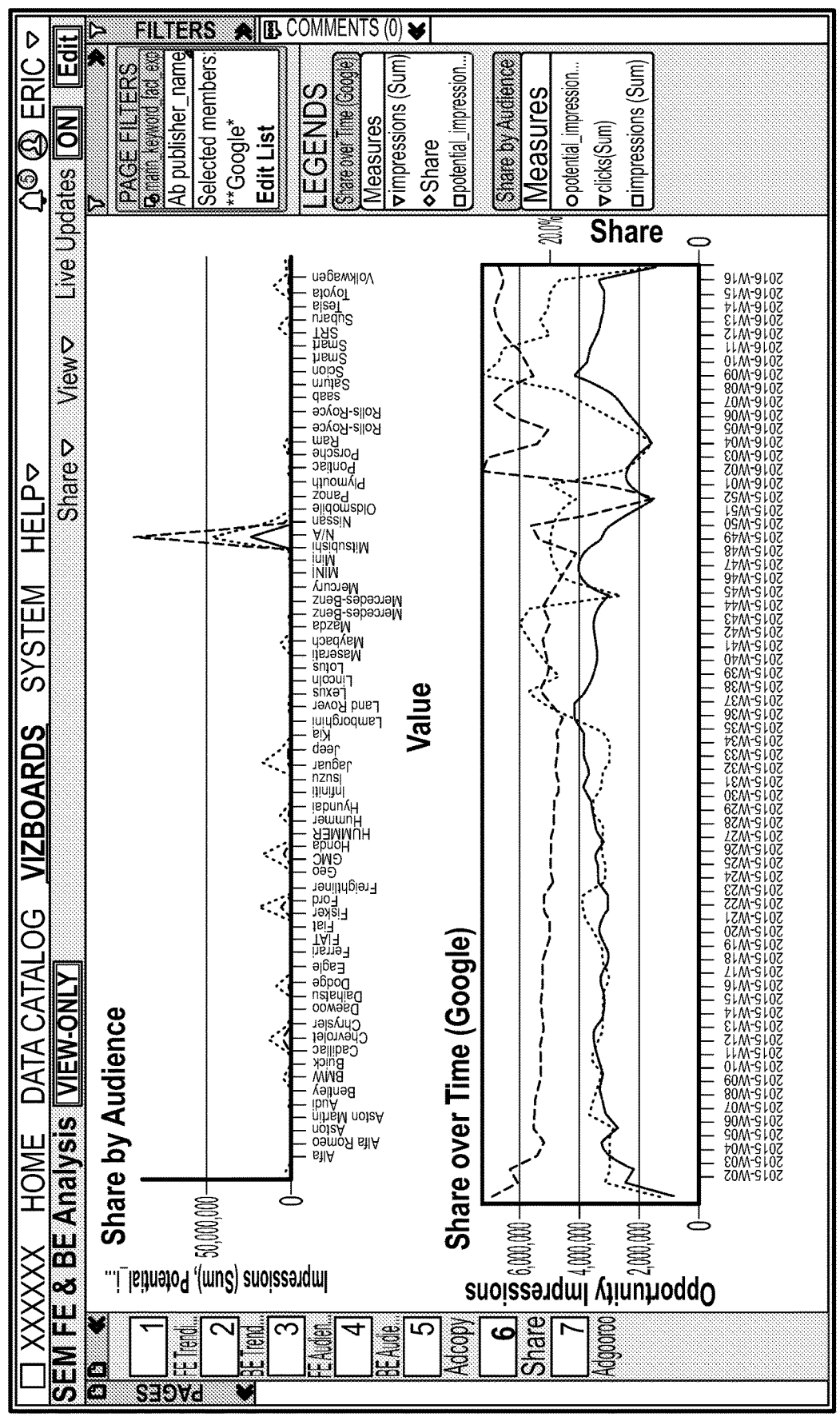

FIG. 6 is a flowchart illustrating an example process 600 in accordance with various embodiments of the present disclosure. The process 600 may begin with receiving, over a network, a first data set comprising information specifying advertisement performance data, wherein the performance data comprises one or more performance data sets, each comprising one or more performance metrics and each being associated with one or more first identifiers (602). For example, the management computing entity 100 may receive the ad performance data set 510. In one implementation, the ad performance data set 510 includes a plurality of rows each including an advertisement identifier, an impression identifier, revenue data, a website session identifier, a page instance identifier, and/or the like. In one example, the ad performance data set 510 is provided by an ad management system 504. In some implementations, the ad management system 504 is owned and maintained by a different entity than the website 506. In some implementations, the ad performance data set 510 is received by the management computing entity 100 via the network 105.

The process 600 may continue with receiving, over a network, a second data set comprising information specifying user behavior data, wherein the user behavior data comprises a plurality of historical information data sets, each being associated with one or more second identifiers (604). In one implementation, the user behavior data may be historical data associated with a user and/or a user device. In some implementations, the historical data may be browsing data associated with the website 506. In one example, the management computing entity 100 may receive the consumer behavior data set 520. In one implementation, the consumer behavior data set 520 includes a plurality of rows each including a visit identifier, a visitor identifier, a campaign identifier, event data, a website session identifier, a page instance identifier, and/or the like. In one example, the consumer behavior data set 520 is provided by the web analytics system 502. In some implementations, the web analytics system is owned and maintained by a different entity than the website 506. For example, the web analytics system 502 may be owned and maintained by an analytics service provider. In some implementations, the consumer behavior data set 520 is received by the management computing entity 100 the via network 105.

The process 600 may continue with receiving, over a network, a third data set comprising information specifying marketing campaign data, wherein the marketing campaign data comprises one or more marketing campaign data sets, each specifying one or more marketing criteria and each being associated with one or more third identifiers (606). For example, the management computing entity 100 may receive the campaign management data set 530. In one implementation, the campaign management data set 530 may be data specifying one or more advertisement targeting keywords associated with particular advertisement campaigns. In one implementation, the campaign management data set 530 includes a plurality of rows each including a campaign identifier, keyword data, and/or the like. In one example, the campaign management data set 530 is provided by the web campaign management system 508. In some implementations, the campaign management system 508 is owned and maintained by a different entity than the website 506. For example, the web analytics system 502 may be owned and maintained by a campaign management service provider. In some implementations, the campaign management data set 530 is received by the management computing entity 100 via the network 105.

The process 600 may continue with determining that a first identifier from the first identifiers, that is associated with a particular performance data set, matches a first identifier from the second identifiers, that is associated with a particular historical information data set, and that a second identifier from the second identifiers, that is associated with the particular historical information data set, matches a first identifier from the third identifiers, that is associated with a particular marketing data set (608). For example, the management computing entity 100 may determine that the web session identifier associated with a particular row of the consumer behavior data set 520 matches the web session identifier associated with a second particular row of the ad performance data set 510. Similarly, the management computing entity 100 may determine that the campaign identifier associated with a third particular row of the consumer behavior data set 520 matches the campaign identifier associated with a fourth particular row of the campaign management data set 530. In turn, the process 600 in response to the determination, continues with merging the particular performance data set, the particular historical information data set, and the particular marketing data set, to generate a combined data set (610). For example, the management computing entity 100 may merge or combine the above rows from the data sets 510, 520, and 530 to generate the combined or unified data set 540. The process 600 may then continue with storing the combined data set in the data storage apparatus in association with, at least, the first identifier from the first identifiers (612). For example, the management computing entity 100 may store the combined or unified data set 540 in a local data store or a data store accessible via the network 105.

In some implementations, the process 600 may continue with the optional steps of the process 700, shown in phantom. The process 700 may begin with providing instructions to a user device, that cause the user device to display a graphical user interface for displaying a visual representation associated with the stored combined data set (702). For example, the management computing entity 100 may provide instructions to a user device 110 to display a graphical user interface as shown in FIGS. 11A-11E to visualize data associated with or from the unified data set 540.

The process 700 may continue with receiving data indicative of a user interaction with the graphical user interface and, in response, filter the stored combined data set according to one or more criteria associated with the user interaction and provide data that causes the graphical user interface to display a visual representation associated with the filtered combined data set (704). For example, a user may provide input via the user device 110 to filter the displayed data associated with the unified data set 540. For example, a user may interact with an element within the graphical user interface in order to view performance data associated with a particular keyword for targeting advertisements. In one example, the user may interact with an element within the graphical user interface in order to view performance data associated with a particular user and/or visit. In one example, the user may interact with an element within the graphical user interface in order to view performance data associated with a particular user defined period. FIGS. 11A-11E depict various data views according to different filtering criteria specified by the user via interactions with the graphical user interface.

In some implementations, the process 600 may continue with the optional steps of process 800, shown in phantom. The process 800 may begin with determining, based at least in part on the combined data set, a programmatically expected traffic to the website during a configurable period (802). For example, the management computing entity 100 may predict, based on the unified data set 540, a programmatically expected number of visitors during a user specified period. In one implementation, the prediction may be based on a machine learning model. In one example, attributes from the unified data set 540 may be used to train a machine learning model to determine a programmatically expected number of visitors or a programmatically expected traffic during the specified period. In one implementation, the machine learning model is a random forest model. Other suitable models may be used similarly.

The process 800 continues with determining an optimal number of processing servers for performing operations associated with maintaining the website based on the programmatically expected traffic and in response allocating the optimal number of servers for performing the operations associated with maintaining the website (804). For example, in response to determining the programmatically expected number of visitors or traffic during the specified period, an optimal number of processing and hosting servers may be allocated for hosting and maintaining the website. In one example, if reduced traffic is expected, one or more servers may be shut down or disabled. Alternatively, if website traffic is expected to rise, additional servers may be activated. Accordingly, the power consumption and maintenance costs may be reduced. In turn, the revenue may be increased.

In some implementations, the process 600 may continue with the optional steps of the process 900, shown in phantom. The process 900 may begin with determining that a programmatically expected revenue, associated with adjusting one or more particular marketing campaign parameters, exceeds a current revenue, wherein the programmatically expected revenue and the current revenue are determined at least in part based on the combined data set (902). For example, the management computing entity 100 may determine that the programmatically expected revenue associated with adjusting one or more of the advertisement campaign parameters exceeds the current revenue. In one example, the management computing entity 100 may determine that the programmatically expected revenue associated with removing one or more keywords from the advertisement campaign is higher than the current revenue. Similar determinations may be made in association with adjusting other parameters. In turn, the process 900 may continue with adjusting the particular one or more marketing campaign parameters in response to the determination (904). For example, the management computing entity 100 may then remove one or more keywords from the advertisement campaign. As discussed above, similar modifications and adjustments may be carried out similarly.

In some implementations, the process 600 may continue with the optional steps of the process 1000, shown in phantom. The process 1000 may begin by providing, at least, the combined data set to the machine learning model to train the machine learning model (1002). For example, the management computing entity 100 may provide the unified data set 540 to a machine learning model to train the machine learning model. In turn, the process 1000 may continue with determining by the machine learning model, based on at least the combined data set and one or more configurable marketing campaign parameters, a first prediction value that indicates a programmatically expected number of visitors that are likely to perform one or more actions that result in a purchase and a programmatically expected purchase value for each user based at least in part on the combined data set and programmatically expected traffic to the website during a configurable period (1004). For example, the machine learning model may determine an expected number of visitors during an upcoming six-month period. Similarly, the machine learning model may determine a portion of the expected number of visitors that are likely to make a purchase or complete a transaction and the revenue value associated with each purchase and/or transaction.

The process 1000 may then continue with determining a programmatically expected revenue associated with the website (1006). For example, the management computing entity 100 may calculate an expected revenue for the six-month period based on the predictions described above. In turn, the process 1000 may continue with determining a current revenue based, at least in part, on the combined data set (1008). For example, the management computing entity 100 may determine a current revenue based on the unified data set 540. The process 1000 then may determine that the programmatically expected revenue exceeds a current revenue (1010). For example, the management computing entity 100 may compare the programmatically expected revenue with the current revenue to determine that the programmatically expected revenue exceeds the current revenue. Finally, the process 1000 may end with replacing one or more current marketing campaign parameters with the configurable marketing campaign parameters (1012). In some implementations, the machine learning model may identify the most effective configurable parameters to adjust.

In some implementations, the management computing entity 100 may employ machine learning to identify configurable parameters that affect revenue the most. In some implementations, the machine learning model may be used to determine a plurality of programmatically expected performance measures (e.g., revenue). For example, machine learning algorithms may be used to determine optimal parameter values for increasing and/or maximizing revenue.

Performance attributes may be determined periodically (e.g., daily, weekly, and monthly) from the unified data set 540. Clustered or non-clustered attributes may be used to train a machine learning model. It should be understood that the selection of attributes or clusters of attributes for training machine learning models for optimization processes can greatly affect the respective performance. In some implementations, attributes and/or clusters of attributes are selected based on a statistical analysis associated with the optimization. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and excludes the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model. Yet in other implementations, the attributes may be selected by a user as described herein.

In some implementations, the attribute selection process is performed according to a random forest model. The model may operate by constructing multiple decision trees at training. Each decision tree may be based on different attributes. In some implementations, the random forest model output is the mode of attributes or the most occurring attributes among all the trees of the random forest. In some implementations, the random forest model is trained with historical data associated with various attributes (e.g., the unified data set 540). In some implementations, different trained models may be utilized for different locations and/or types of attributes.

IV. ADDITIONAL IMPLEMENTATION DETAILS

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, the information/data processing apparatus. Alternatively, or in addition, the program instructions can be encoded on an artificially generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

V. CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A system for optimizing a marketing campaign associated with a website, based on a plurality of data sets that include, at least, a user behavior data set, an advertisement performance data set, and an advertisement campaign data set, the system comprising:

a data storage apparatus;
a computer server coupled to the data storage apparatus, wherein the data storage apparatus contains data specifying instructions that when executed cause the computer server to perform operations comprising:
receiving, over a network, a first data set comprising information specifying advertisement performance data, wherein the advertisement performance data comprises one or more performance data sets, each comprising one or more performance metrics and each being associated with one or more first identifiers;
receiving, over the network, a second data set comprising information specifying user behavior data, wherein the user behavior data comprises a plurality of historical information data sets, each being associated with one or more second identifiers;
receiving, over the network, a third data set comprising information specifying marketing campaign data, wherein the marketing campaign data comprises one or more marketing campaign data sets, each specifying one or more marketing criteria and each being associated with one or more third identifiers;
determining that a first identifier from the first identifiers, that is associated with a particular performance data set, matches a first identifier from the second identifiers, that is associated with a particular historical information data set, and that a second identifier from the second identifiers, that is associated with the particular historical information data set, matches a first identifier from the third identifiers, that is associated with a particular marketing data set;
in response to the determination, merging the particular performance data set, the particular historical information data set, and the particular marketing data set to generate a combined data set;

storing the combined data set in the data storage apparatus in association with, at least, the first identifier from the first identifiers;

determining, based on at least the combined data set and one or more configurable marketing campaign parameters, a first prediction value that indicates an expected number of visitors that are likely to perform one or more actions that result in a purchase and an expected purchase value for each user;

determining, an expected revenue associated with the website;

determining the expected revenue exceeds a current revenue associated with the website; and adjusting one or more current marketing campaign parameters based on the determining that the expected revenue exceeds the current revenue.

2. The system of claim 1, wherein the storing further comprises storing the combined data set in association with the first identifier from the third identifiers.

3. The system of claim 1, wherein the first and second identifiers each include a website session identifier.

4. The system of claim 1, wherein the first and second identifiers each include a page instance identifier.

5. The system of claim 1, wherein the second and third identifiers each include a campaign identifier.

6. The system of claim 1, wherein the operations further comprise: providing instructions to a user device, that cause the user device to display a graphical user interface for displaying a visual representation associated with the stored combined data set.

7. The system of claim 6, wherein the operations further comprise:

receiving data indicative of a user interaction with the graphical user interface and, in response, filter the stored combined data set according to one or more criteria associated with the user interaction and provide data that causes the graphical user interface to display a visual representation associated with the filtered combined data set.

8. The system of claim 1, wherein the operations further comprise:

determining, based at least in part on the combined data set, an expected traffic to the website during a configurable period; and determining an optimal number of processing servers for performing operations associated with maintaining the website based on the expected traffic and in response allocating the optimal number of processing servers for performing the operations associated with maintaining the website.

9. The system of claim 1, wherein the operations further comprise:

determining that the expected revenue, associated with adjusting one or more particular marketing campaign parameters, exceeds the current revenue, wherein the expected revenue and the current revenue are determined based at least in part on the combined data set; and adjusting the particular one or more marketing campaign parameters in response to the determination.

10. The system of claim 1, wherein determining the first prediction value is based on a machine learning model.

11. The system of claim 10, wherein determining the configurable marketing campaign parameters is based on a machine learning model.

12. The system of claim 11, wherein the operations further comprise providing, at least, the combined data set to the machine learning model.

13. The system of claim 11, wherein the machine learning model is a random forest model.

14. The system of claim 1, wherein the operations further comprise:

determining the current revenue based, at least in part, on the combined data set;

determining that the expected revenue exceeds the current revenue; and replacing one or more current marketing campaign parameters with the one or more configurable marketing campaign parameters.

15. The system of claim 1, wherein the operations further comprise training a machine learning model using at least a portion of the combined data set.

16. A method for optimizing a marketing campaign associated with a website, based on a plurality of data sets that include, at least, a user behavior data set, an advertisement performance data set, and an advertisement campaign data set, the method comprising:

receiving, over a network, a first data set comprising information specifying advertisement performance data, wherein the advertisement performance data comprises one or more performance data sets, each comprising one or more performance metrics and each being associated with one or more first identifiers;

receiving, over the network, a second data set comprising information specifying user behavior data, wherein the user behavior data comprises a plurality of historical information data sets, each being associated with one or more second identifiers;

receiving, over the network, a third data set comprising information specifying marketing campaign data, wherein the marketing campaign data comprises one or more marketing campaign data sets, each specifying one or more marketing criteria and each being associated with one or more third identifiers;

determining that a first identifier from the first identifiers, that is associated with a particular performance data set, matches a first identifier from the second identifiers, that is associated with a particular historical information data set, and that a second identifier from the second identifiers, that is associated with the particular historical information data set, matches a first identifier from the third identifiers, that is associated with a particular marketing data set;

in response to the determination, merging the particular performance data set, the particular historical information data set, and the particular marketing data set, to generate a combined data set;

storing the combined data set in a data storage apparatus in association with, at least, the first identifier from the first identifiers;

determining, based on at least the combined data set and one or more configurable marketing campaign parameters, a first prediction value that indicates an expected number of visitors that are likely to perform one or more actions that result in a purchase and an expected purchase value for each user;

determining the expected revenue exceeds a current revenue associated with the website; and adjusting one or more current marketing campaign parameters based on the determining that the expected revenue exceeds the current revenue.

17. The method of claim 16, wherein the storing further comprises storing the combined data set in association with the first identifier from the third identifiers, wherein the first and second identifiers each include a website session identifier, wherein the first and second identifiers each include a page instance identifier, and wherein the second and third identifiers each include a campaign identifier.

18. The method of claim 16, further comprising:
providing instructions to a user device, that causes the user device to display a graphical user interface for displaying a visual representation associated with the stored combined data set; and
receiving data indicative of a user interaction with the graphical user interface and, in response, filter the stored combined data set according to one or more criteria associated with the user interaction and provide data that causes the graphical user interface to display a visual representation associated with the filtered combined data set.

19. The method of claim 16, further comprising:
determining, based at least in part on the combined data set, an expected traffic to the website during a configurable period; and
determining an optimal number of processing servers for performing operations associated with maintaining the website based on the expected traffic and in response allocating the optimal number of processing servers for performing the operations associated with maintaining the website.

20. The method of claim 16, further comprising:
determining that the expected revenue, associated with adjusting one or more particular marketing campaign parameters, exceeds the current revenue, wherein the expected revenue and the current revenue are determined based at least in part on the combined data set; and
adjusting the particular one or more marketing campaign parameters in response to the determination.

21. The method of claim 16, further comprising:
determining the current revenue based, at least in part, on the combined data set;
determining that the expected revenue exceeds the current revenue; and
replacing one or more current marketing campaign parameters with the configurable marketing campaign parameters.

22. The method of claim 16, further comprising training a machine learning model using at least a portion of the combined data set.

23. A non-transitory computer-readable storage medium having computer-readable program code portions stored thereon that, when executed by one or more computing devices, cause the one or more computing devices to perform operations comprising:
receiving, over a network, a first data set comprising information specifying advertisement performance data, wherein the advertisement performance data comprises one or more performance data sets, each comprising one or more performance metrics and each being associated with one or more first identifiers;
receiving, over the network, a second data set comprising information specifying user behavior data, wherein the user behavior data comprises a plurality of historical information data sets, each being associated with one or more second identifiers;
receiving, over the network, a third data set comprising information specifying marketing campaign data, wherein the marketing campaign data comprises one or more marketing campaign data sets, each specifying one or more marketing criteria and each being associated with one or more third identifiers;
determining that a first identifier from the first identifiers, that is associated with a particular performance data set, matches a first identifier from the second identifiers, that is associated with a particular historical information data set, and that a second identifier from the second identifiers, that is associated with the particular historical information data set, matches a first identifier from the third identifiers, that is associated with a particular marketing data set;
in response to the determination, merging the particular performance data set, the particular historical information data set, and the particular marketing data set to generate a combined data set; and
storing the combined data set in a data storage apparatus in association with, at least, the first identifier from the first identifiers;
determining, based on at least the combined data set and one or more configurable marketing campaign parameters associated with a website, a first prediction value that indicates an expected number of visitors that are likely to perform one or more actions that result in a purchase and an expected purchase value for each user;
determining an expected revenue associated with the website;
determining the expected revenue exceeds a current revenue associated with the website; and
adjusting one or more current marketing campaign parameters based on the determining that the expected revenue exceeds the current revenue.

* * * * *